(12) United States Patent
Li et al.

(10) Patent No.: US 11,477,549 B2
(45) Date of Patent: Oct. 18, 2022

(54) TRANSMISSION NETWORK SYSTEM, DATA SWITCHING AND TRANSMISSION METHOD, APPARATUS AND EQUIPMENT

(71) Applicants: China Mobile Communication Co., Ltd Research Institute, Beijing (CN); China Mobile Communications Group Co., Ltd., Beijing (CN)

(72) Inventors: Han Li, Beijing (CN); Weiqiang Cheng, Beijing (CN); Lei Wang, Beijing (CN); Minxue Wang, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 20 days.

(21) Appl. No.: 16/622,998

(22) PCT Filed: Jun. 13, 2018

(86) PCT No.: PCT/CN2018/091022
§ 371 (c)(1),
(2) Date: Dec. 16, 2019

(87) PCT Pub. No.: WO2018/228420
PCT Pub. Date: Dec. 20, 2018

(65) Prior Publication Data
US 2021/0152898 A1 May 20, 2021

(30) Foreign Application Priority Data
Jun. 16, 2017 (CN) .......................... 201710458028.3

(51) Int. Cl.
*H04Q 11/00* (2006.01)
*H04B 10/27* (2013.01)

(52) U.S. Cl.
CPC ......... *H04Q 11/0005* (2013.01); *H04B 10/27* (2013.01); *H04J 2203/0008* (2013.01); *H04J 2203/0085* (2013.01)

(58) Field of Classification Search
CPC ........... H04Q 11/0005; H04Q 11/0066; H04Q 11/0067; H04Q 11/0071; H04Q 11/0086
See application file for complete search history.

(56) References Cited

U.S. PATENT DOCUMENTS

2016/0028586 A1\* 1/2016 Blair ................... H04L 41/0826
398/45
2017/0005742 A1 1/2017 Gareau et al.
(Continued)

FOREIGN PATENT DOCUMENTS

| CN | 101656743 A | 2/2010 |
| CN | 105429840 A | 3/2016 |

(Continued)

OTHER PUBLICATIONS

Optical Internetworking Forum, Flex Ethernet Implementation Agreement, IA # OIF-FLEXE-01.0, Mar. 2016; <retrieved from the internet Apr. 3, 2021, url: https://www.oiforum.eom/wp-content/uploads/2019/01/OIF-FLEXE-01.0.pdf> (Year: 2016).\*
(Continued)

*Primary Examiner* — Nathan M Cors
(74) *Attorney, Agent, or Firm* — Price Heneveld LLP (57) ABSTRACT

A transmission network system, data switching and transmission method, apparatus and equipment are provided. The transmission network system includes: a flexible Ethernet group located at a physical layer; at least one flexible Ethernet client carried over the flexible Ethernet group; a flexible Ethernet time slot control module, configured to map, according to a block sequence, service data coming from an upper layer onto the flexible Ethernet group, and recover, from a block sequence received by the flexible (Continued)

Ethernet group, corresponding service data; a flexible Ethernet switching module, configured to perform switching in a physical layer and transmission of service data according to the block sequence.

12 Claims, 3 Drawing Sheets

(56) References Cited

U.S. PATENT DOCUMENTS

| | | | | |
|---|---|---|---|---|
| 2017/0005949 | A1* | 1/2017 | Gareau | H04L 12/413 |
| 2017/0349311 | A1* | 12/2017 | Stone | B29C 66/3462 |
| 2018/0159785 | A1 | 6/2018 | Wu et al. | |
| 2019/0280797 | A1* | 9/2019 | Zha | H04L 12/407 |

FOREIGN PATENT DOCUMENTS

| | | |
|---|---|---|
| CN | 106411454 A | 2/2017 |
| CN | 106612203 A | 5/2017 |
| CN | 106612220 A | 5/2017 |
| CN | 106803814 A | 6/2017 |
| CN | 106850465 A | 6/2017 |

OTHER PUBLICATIONS

"IEEE Standard for Ethernet," in IEEE Std 802.3-2015 (Revision of IEEE Std 802.3-2012), vol. No., pp. 1-4017, Mar. 4, 2016, doi: 10.1109/IEEESTD.2016.7428776. (Year: 2016).*

* cited by examiner

Fig. 6

TRANSMISSION NETWORK SYSTEM, DATA SWITCHING AND TRANSMISSION METHOD, APPARATUS AND EQUIPMENT

CROSS-REFERENCE TO RELATED APPLICATION

The present application is the U.S. national phase of PCT Application No. PCT/CN2018/091022 filed on Jun. 13, 2018, which claims a priority of the Chinese patent application No. 201710458028.3 filed in China on Jun. 16, 2017, a disclosure of which is incorporated herein by reference in its entirety.

TECHNICAL FIELD

The present disclosure relates to the field of computer network technology, in particular to a transmission network system, data switching and transmission method, data switching and transmission apparatus and data switching and transmission equipment.

BACKGROUND

Network slicing is demanded in $5^{th}$ generation (5G) network to slice a same transmission network into different logical network slices, such that a true physical isolation between various slices is guaranteed for a user in each slice. Meanwhile, there are further demands on the slicing as follows.

The slicing should be able to be performed for different subsidiary companies of a network operator or virtual operators, etc., to facilitate operation and maintenance as well as service maintenance. The different subsidiary companies or virtual carriers specialize in offering specific services for respective types of subscribers.

The transmission slice for a subsidiary company should be further sliced into multiple service-oriented slices. For example, a mobile backhaul-oriented network may be sliced into slices customized for different service requirements, such as URLLC service (e.g., self-driving, ultra-reliable low latency communications service), enhanced mobile broadband (EMBB) (high traffic mobile broadband service such as 3D ultra-high definition video (UHDV)), massive machine type communications (mMTC) (e.g., large scale internet of things (IOT)).

Technically speaking, these requirements entail a partition in an L1 layer (physical layer) to enable true physical isolation between slices, and further a support for resource isolation in an L2 layer (data link layer) or even a higher layer when an additional slicing is performed on the basis of different slices. Thus, both an isolation and switching in the L1 layer and an isolation and switching in the L2 or higher layer are required for this network system.

As a pipe technique, optical transport network (OTN) is widely applied to operators' networks, which is capable of supporting switching in the L1 layer. By superposing a packet-based network on the OTN, functions related to 5G networking may be supported.

Figure 1:
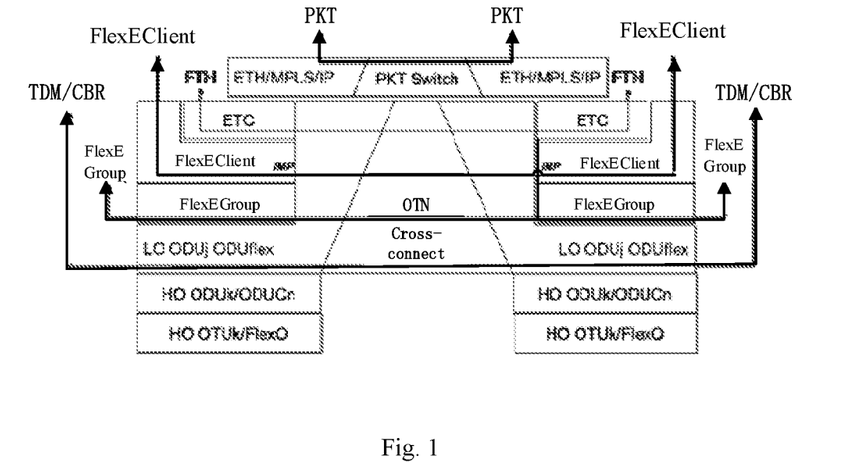
FIG. 1 is a schematic diagram of a system architecture of an optical transmission network in the related art.

FIG. 1 illustrates an architecture in which low-order ODUj (optical data unit) and ODUflex cross-connect (XC) of OTN is used as a basic core of a future 5G transmission network. This OTN-based 5G mobile transmission network architecture is capable of supporting functions such as hard-isolation, network slicing and multi-service by means of ODUk isolation at a bottom layer.

However, the scheme requires multi-layer mappings, therefore having a low efficiency. Moreover, it is difficult to associate a cross-connect at the L1 layer with a cross-connect at a packet (service) layer.

It is necessary for a 5G network, as an end-to-end IP-based network, to support service isolation and network slicing. To implement these functions, the conventional OTN network has the following problems to tackle.

1) The OTN is based on ODUk. The mapping of ODUk is complex and a special encapsulation is required for the ODUk to carry a packet. It is complex to manage and hard to schedule a linked relationship between the L1 layer and the packet in an upper layer.

2) The transmission node in the OTN handles data in unit of ODUk, leading to a large latency.

3) When an Ethernet service, particularly flexible Ethernet (FlexE), is carried over the OTN, the encapsulation efficiency is low.

4) The industry chain associated with the OTN is relatively limited, resulting in a high chip cost.

SUMMARY

The present disclosure provides a transmission network system, data switching and transmission method, data switching and transmission apparatus and data switching and transmission equipment. By incorporating the flexible Ethernet, embodiments of the present disclosure enable network slicing in L1 layer, so as to meet the requirements of future network services.

To solve the above technical problems, the present disclosure provides the following solution.

A transmission network system includes: a flexible Ethernet group located at a physical layer; at least one flexible Ethernet client carried over the flexible Ethernet group; a flexible Ethernet time slot control module, configured to map, according to a block sequence, service data from an upper layer onto the flexible Ethernet group; and recover, from the block sequence received by the flexible Ethernet group, corresponding service data; a flexible Ethernet switching module, configured to perform switching in a physical layer and transmission of the service data according to the block sequence.

The block sequence includes a series of blocks of a preset size.

The blocks of the preset size are 66-bit blocks.

The service data from the upper layer includes non-packet-switched service data.

The flexible Ethernet group includes a group of Ethernet physical sublayer optical interfaces (PHYs) formed by at least one PHY.

The calendar module for the flexible Ethernet group divides the flexible Ethernet group into a plurality of time slots and bonds the flexible Ethernet client to at least one time slot of the plurality of time slots to perform the transmission of the service data.

Data alignment of the PHYs of the flexible Ethernet group is achieved by inserting a flexible Ethernet overhead in the block sequence carried by the flexible Ethernet group.

The flexible Ethernet overhead includes: a flexible Ethernet calendar module configuration, a flexible Ethernet group identifier, a flexible Ethernet client identifier and/or management channel data.

Each PHY of the flexible Ethernet group has a preset quantity of overhead blocks carrying the flexible Ethernet overhead.

The overhead blocks and service data blocks are of a spaced distribution according to a preset period.

The flexible Ethernet switching module is specifically configured to perform the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

The present disclosure further provides a data switching and transmission method. The method includes: receiving service data from an upper layer; mapping, according to a block sequence, the service data coming from the upper layer onto a flexible Ethernet group located at a physical layer; performing switching in a physical layer and transmission of the service data according to the block sequence.

The method further includes: recovering, from the block sequence received by the flexible Ethernet group, corresponding service data.

The mapping, according to the block sequence, the service data from the upper layer onto the flexible Ethernet group located at the physical layer includes: mapping, according to the block sequence, non-packet-switched service data from the upper layer onto the flexible Ethernet group located at the physical layer.

When the non-packet-switched service data includes service data in 66-bit blocks, the mapping, according to the block sequence, the non-packet-switched service data from the upper layer onto the flexible Ethernet group located at the physical layer includes: mapping, according to a 66-bit block sequence, the service data in 66-bit blocks from the upper layer onto the flexible Ethernet group located at the physical layer.

When the non-packet-switched service data includes service data not in 66-bit blocks, the mapping, according to the block sequence, the non-packet-switched service data from the upper layer onto the flexible Ethernet group located at the physical layer includes: disassembling the service data not in 66-bit blocks to obtain a payload of the service data, encapsulating the payload into 66-bit blocks, and mapping, according to a 66-bit block sequence, the 66-bit blocks onto the flexible Ethernet group located at the physical layer.

The performing switching in a physical layer and transmission of the service data according to the block sequence includes: performing the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

The present disclosure further provides a data switching and transmission apparatus. The apparatus includes: a reception module, configured to receive service data from an upper layer; a flexible Ethernet time slot control module, configured to map, according to a block sequence, the service data from the upper layer onto a flexible Ethernet group located at a physical layer; a flexible Ethernet switching module, configured to perform switching in a physical layer and transmission of the service data according to the block sequence.

The flexible Ethernet time slot control module is further configured to recover, from the block sequence received by the flexible Ethernet group, corresponding service data.

The apparatus further includes: a service identification module, configured to identify the service data from the upper layer, and map, according to the block sequence, identified non-packet-switched service data from the upper layer onto the flexible Ethernet group located at the physical layer.

The apparatus further includes a flexible Ethernet client carried over the flexible Ethernet group, where the flexible Ethernet client is configured to: when it is identified by the service identification module that the non-packet-switched service data includes service data in 66-bit blocks, map, according to a 66-bit block sequence, the service data in 66-bit blocks from the upper layer onto the flexible Ethernet group located at the physical layer; or when it is identified by the service identification module that the non-packet-switched service data includes service data not in 66-bit blocks, disassemble the service data not in 66-bit blocks to obtain a payload of the service data, encapsulate the payload into 66-bit blocks, and map, according to a 66-bit block sequence, the 66-bit blocks onto the flexible Ethernet group located at the physical layer.

The flexible Ethernet switching module is specifically configured to: perform the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

The present disclosure further provides data switching and transmission equipment. The equipment includes: a flexible Ethernet group located at a physical layer; at least one flexible Ethernet client carried over the flexible Ethernet group; a flexible Ethernet time slot control module, configured to map, according to a block sequence, service data from an upper layer onto the flexible Ethernet group; and recover, from the block sequence received by the flexible Ethernet group, corresponding service data; a flexible Ethernet switching module, configured to perform a switching in the physical layer and transmission of the service data according to the block sequence.

The flexible Ethernet switching module is located in a forwarding plane module of the data switching and transmission equipment, and the forwarding plane module is provided with at least one flexible Ethernet interface.

The present disclosure further provides a transmission network system. The system includes: an Ethernet transmission subsystem and an optical network transmission subsystem, where the Ethernet transmission subsystem and the optical network transmission subsystem are connected via a unified cross switching matrix; the Ethernet transmission subsystem includes: a flexible Ethernet group located at a physical layer; at least one flexible Ethernet client carried over the flexible Ethernet group; a flexible Ethernet time slot control module, configured to map, according to a block sequence, service data from an upper layer onto the flexible Ethernet group; and recover, from the block sequence received by the flexible Ethernet group, corresponding service data; a flexible Ethernet switching module, configured to perform switching in a physical layer and transmission of the service data according to the block sequence; the optical network transmission subsystem includes: at least one optical network unit; a flexible Ethernet group; at least one flexible Ethernet client carried over the flexible Ethernet group; a flexible Ethernet time slot control module, configured to map service data from an upper layer into the at least one optical network unit via the flexible Ethernet group; and recover, from data received by the at least one optical network unit, corresponding service data; an optical network switching module, configured to perform switching and transmission of service data according to a block sequence whose size is a preset times of the block sequence divided by the optical network unit; where the optical network switching module and the flexible Ethernet switching module are separately connected to the unified cross switching matrix.

The unified cross switching matrix is a switching device, and the switching device is provided with a slot for connecting the optical network switching module and a slot for connecting the flexible Ethernet switching module.

The optical network switching module is a programmable OTN card, and the flexible Ethernet switching module is a programmable flexible Ethernet network card.

The present disclosure further provides a data switching and transmission apparatus. The apparatus includes: a processor, a memory and a computer program stored in the memory and configured to be executed by the processor, where the processor is configured to execute the computer program, to implement steps of the aforementioned data switching and transmission method.

The present disclosure further provides a computer readable storage medium storing therein a computer program, where the computer program is configured to be executed by a processor, to implement steps of the aforementioned data switching and transmission method.

The present disclosure further provides a transmission network system. The system includes: a flexible Ethernet group located at a physical layer; at least one flexible Ethernet client carried over the flexible Ethernet group; and a processor and a memory, where the processor is configured to read a program in the memory to: map, according to a block sequence, service data from an upper layer onto the flexible Ethernet group; and recover, from the block sequence received by the flexible Ethernet group, corresponding service data; and perform switching in a physical layer and transmission of the service data according to the block sequence.

The present disclosure further provides data switching and transmission equipment. The equipment includes: a flexible Ethernet group located at a physical layer; at least one flexible Ethernet client carried over the flexible Ethernet group; and a processor and a memory, where the processor is configured to read a program in the memory to: map, according to a block sequence, service data coming from an upper layer onto the flexible Ethernet group; and recover, from the block sequence received by the flexible Ethernet group, corresponding service data; and perform switching in a physical layer and transmission of the service data according to the block sequence.

The present disclosure further provides a transmission network system. The system includes: an Ethernet transmission subsystem and an optical network transmission subsystem, where the Ethernet transmission subsystem and the optical network transmission subsystem are connected via a unified cross switching matrix. The Ethernet transmission subsystem includes: a flexible Ethernet group located at a physical layer; at least one flexible Ethernet client carried over the flexible Ethernet group; and a processor and a memory, where the processor is configured to read a program in the memory to: map, according to a block sequence, service data from an upper layer onto the flexible Ethernet group; and recover, from the block sequence received by the flexible Ethernet group, corresponding service data; and perform switching in a physical layer and transmission of the service data according to the block sequence. The optical network transmission subsystem includes: at least one optical network unit; a flexible Ethernet group; at least one flexible Ethernet client carried over the flexible Ethernet group; and a processor and a memory, where the processor is configured to read a program in the memory to: map service data from an upper layer into the at least one optical network unit via the flexible Ethernet group; and recover, from data received by the at least one optical network unit, corresponding service data; perform switching and transmission of service data according to a block sequence whose size is a preset times of the block sequence divided by the optical network unit.

The foregoing solutions of the present disclosure have at least the following advantageous effects: according to the foregoing solutions of the present disclosure, by introducing the flexible Ethernet as a switching core into the L1 layer (physical layer) network, the aforementioned basic functions of 5G transport network may be provided in a simple and efficient manner; additionally, the industry chain for Ethernet may be adopted, and flexible 3-layer functions are supported, thereby associating the L1 layer network with an upper layer network. Further, the switching may be performed directly on 66-bit blocks, thereby reducing latency resulting from a message recovery process, and jitter resulting from a L2 layer switching. The foregoing solutions of the present disclosure enable slicing in the L1 layer by incorporating the flexible Ethernet, so as to meet the requirements of future network services.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Figure 2:
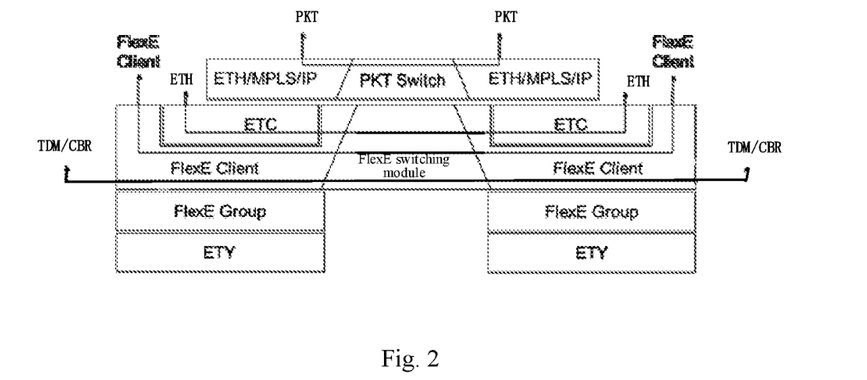
FIG. 2 is a schematic diagram of an architecture of a transmission network system provided by some embodiments of the present disclosure.

As shown in FIG. 2, by introducing the flexible Ethernet as a switching core into the L1 layer (physical layer) network, a first transmission network system provided by some embodiments of the present disclosure may provide the aforementioned basic functions of 5G transport network in a simple and efficient manner; additionally, may adopt the industry chain for Ethernet, and support flexible 3-layer functions, thereby associating the L1 layer network with an upper layer network. Further, the switching may be performed directly on 66-bit blocks, thereby reducing latency resulting from a message recovery process, and jitter resulting from a L2 layer switching.

The transmission network system provided by some embodiments of the present disclosure includes: a flexible Ethernet group (FlexEGroup) located at a physical layer (L1 layer); at least one flexible Ethernet client (FlexEClient) carried over the flexible Ethernet group; a flexible Ethernet time slot control module (which is not shown, and located between the flexible Ethernet client and the flexible Ethernet group), configured to map, according to a block sequence, service data coming from an upper layer onto the flexible Ethernet group; and recover, from the block sequence received by the flexible Ethernet group, corresponding service data; a flexible Ethernet switching module, configured to perform a switching in the physical layer and transmission of the service data according to the block sequence.

Specifically, The flexible Ethernet switching module is configured to perform the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

For example, The flexible Ethernet switching module uses the following forwarding table in performing the service data switching:

| input | | output | |
|---|---|---|---|
| Group ID | Client ID | Group ID | Client ID |
| 1 | 3 | 2 | 5 |
| ... | ... | ... | ..., | where the block sequence includes a plurality of blocks of a preset size and the blocks of the preset size include 66-bit blocks. That is, the flexible Ethernet switching module enables a physical layer (L1 layer) switching in 66-bit blocks. In each 66-bit block, 64 bits are used to represent data and 2 bits are used to represent block information, which is generally denoted as 64b/66b.

Meanwhile, in this diagram, ETC refers to classic Ethernet, PKT is an abbreviation of packet, and PKT switch refers to a data switching in Ethernet (ETH)/multi-protocol label switching (MPLS)/internet protocol (IP) layer.

In some embodiments of the present disclosure, the service data coming from the upper layer includes non-packet-switched service data.

The non-packet-switched service data may include, for example, service data of at least one flexible Ethernet client, which is transmitted in a block sequence made up of 66-bit blocks. The flexible Ethernet time slot control module is configured to map, according to a block sequence, upper layer service data (service data of flexible Ethernet client) onto the flexible Ethernet group; and recover, from the block sequence received by the flexible Ethernet group, corresponding service data of flexible Ethernet client.

The non-packet-switched service data may include, for example, Ethernet service data coming from a classic Ethernet (ETC). The flexible Ethernet time slot control module is configured to map, according to a block sequence, upper layer service data (Ethernet service data) onto the flexible Ethernet group; and recover, from the block sequence received by the flexible Ethernet group, corresponding Ethernet service data.

The non-packet-switched service data may include, for example, service data of time division multiplex (TDM) service or service data of constant bit rate (CBR) service (these data are in 10-bit blocks, and in each block payload takes up 8 bits and the remainder occupies 2 bits, which is generally denoted as 8b/10b). These service data may also be converted into a block sequence made up of 66-bit blocks to adapt to the architecture.

Of course, the upper layer service data may include other non-packet-switched service data.

If the upper layer service data is packet-switched service data, e.g., ETH/MPLS/IP layer packet data, the PKT switch performs packet switching directly without mapping the data onto the flexible Ethernet group for transmission.

In some embodiments of the present disclosure, the flexible Ethernet (i.e., flexible Ethernet interface) is as defined in the flexible Ethernet implementation agreement published by Optical Internetworking Forum (OIF). As a physical interface technology, the flexible Ethernet allows transmission at Ethernet MAC rates (i.e., the transmission rates of Ethernet stream or flexible Ethernet client). The Ethernet MAC rates supported by the flexible Ethernet are 10 Gb/s, 40 Gb/s and m×25 Gb/s. For example, the flexible Ethernet group is a group of Ethernet physical sublayer optical interfaces (PHYs) formed by bonding at least one PHY, and may have a transmission rate of up to 100 Gb/s.

A calendar module for the flexible Ethernet group divides the flexible Ethernet group into a plurality of time slots and bonds the flexible Ethernet client to at least one time slot of the plurality of time slots to perform the transmission of the service data.

In specific, the flexible Ethernet employs a calendar mechanism (calendar module). The calendar for the flexible Ethernet group has a granularity of 5G, and 100G PHY is divided into a length of 20 time slots. The flexible Ethernet client may be bonded to at least one time slot of the 20 time slots to perform transmission of service data.

In specific, the flexible Ethernet time slot control module on the flexible Ethernet interface performs the following functions.

1) During transmitting, the flexible Ethernet time slot control module maps the service data of a flexible Ethernet client onto a flexible Ethernet group, encodes the data according to a 66-bit block sequence and may transmit according to IEEE 802.3 rule. The function is also known as flexible Ethernet mux.

2) During receiving, the flexible Ethernet time slot control module disassembles the flexible Ethernet client in the flexible Ethernet group. The function is also known as flexible Ethernet demux.

In some embodiments of the present disclosure, data alignment of the PHYs of the flexible Ethernet group is achieved by inserting a flexible Ethernet overhead in the block sequence carried by the flexible Ethernet group.

The flexible Ethernet overhead includes: a flexible Ethernet calendar configuration, a flexible Ethernet group identifier, a flexible Ethernet client identifier and/or management channel data.

Each PHY of the flexible Ethernet group has a preset quantity of overhead blocks carrying the flexible Ethernet overhead.

The overhead blocks and service data blocks are of a spaced distribution according to a preset period.

For example, the flexible Ethernet overhead is composed of a 66-bit block which is identified independently from flexible Ethernet client data.

The functions of flexible Ethernet include bonding of Ethernet PHYs, sub-rating of Ethernet PHY and channelization (that is, allowing multiple client data streams carried by a single Ethernet PHY or carried by a group of bonded PHYs).

Since traditional flexible Ethernet is merely an interface, data switching has to be performed at L2 layer or a higher layer after a message is recovered.

According to some embodiments of the present disclosure, a L1 layer switching may be performed directly on 66-bit blocks, thereby reducing latency resulting from a message recovery process, and jitter resulting from a L2 layer switching. The operations, administration and maintenance (OAM) and the protection related to the L1 layer may be implemented by expanding corresponding overheads.

Some embodiments of the present disclosure further provide a data switching and transmission method. The method includes the following steps.

A step 11 includes: receiving service data from an upper layer.

A step 12 includes: mapping, according to a block sequence, the service data from the upper layer onto a flexible Ethernet group located at a physical layer.

A step 13 includes: performing a switching in the physical layer and transmission of the service data according to the block sequence.

In some embodiments of the present disclosure, in a same way, a block sequence is mapped onto a flexible Ethernet group located at a physical layer and switching in the physical layer and transmission of the service data is performed according to the block sequence, thereby reducing latency resulting from a message recovery process, and jitter resulting from a L2 layer switching. By incorporating the flexible Ethernet, solutions of the present disclosure enable network slicing in L1 layer, so as to meet the requirements of future network services.

In some embodiments of the present disclosure, the data switching and transmission method may further include a step 14 of recovering, from the block sequence received by the flexible Ethernet group, corresponding service data.

The step 12 may specifically include a step 121 of mapping, according to the block sequence, non-packet-switched service data from the upper layer onto the flexible Ethernet group located at the physical layer.

When the non-packet-switched service includes service data in 66-bit blocks, the step 121 includes: mapping, according to a 66-bit block sequence, the service data in 66-bit blocks from the upper layer onto the flexible Ethernet group located at the physical layer.

When the non-packet-switched service includes service data not in 66-bit blocks, the step 121 includes: disassembling the service data not in 66-bit blocks from the upper layer to obtain a payload of the service data, encapsulating the payload into 66-bit blocks, and mapping, according to a 66-bit block sequence, the 66-bit blocks onto the flexible Ethernet group located at the physical layer.

In some embodiments of the present disclosure, the step 13 may specifically include: performing the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

The flexible Ethernet switching module uses the following forwarding table in performing the service data switching:

| input | | output | |
|---|---|---|---|
| Group ID | Client ID | Group ID | Client ID |
| 1 | 3 | 2 | 5 |
| ... | ... | ... | ... |

Figure 3:
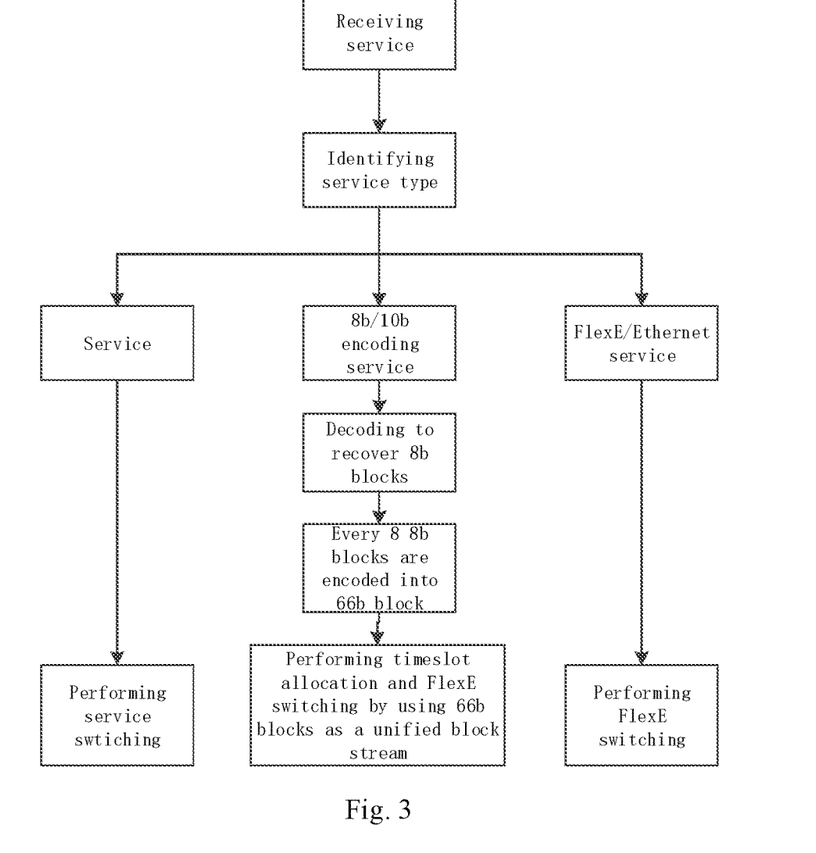
FIG. 3 is a schematic flow diagram of a service data identification, switching and transmission process provided by some embodiments of the present disclosure.

As shown in FIG. 3, an identification and switching method for the services is described in conjunction with a specific process as follows: service data is received from an upper layer; a service type is identified; if it is ETH/MPLS/IP layer packet data, a PKT switch performs a packet switching directly, without mapping the data onto the flexible Ethernet group for transmission; if the service data from the upper layer is Ethernet service data from a classic Ethernet (ETC) or service data from a flexible Ethernet client, a flexible Ethernet time slot control module in the flexible Ethernet switching module is configured to map, according to a block sequence, service data from an upper layer (Ethernet service data) onto the flexible Ethernet group and performs a flexible Ethernet switching; if the service data from the upper layer is TDM service data or CBR service data (i.e., service data encoded in blocks of 10 bits, in which 8 bits are data, generally denoted as 8b/10b), these service data may be decoded to recover 8-bit blocks, a plurality of 8-bit blocks are encoded into 66-bit blocks, and time slot allocation and flexible Ethernet switching are performed by using a block sequence made up of the 66-bit blocks as unified block sequence to be switched.

Figure 4:
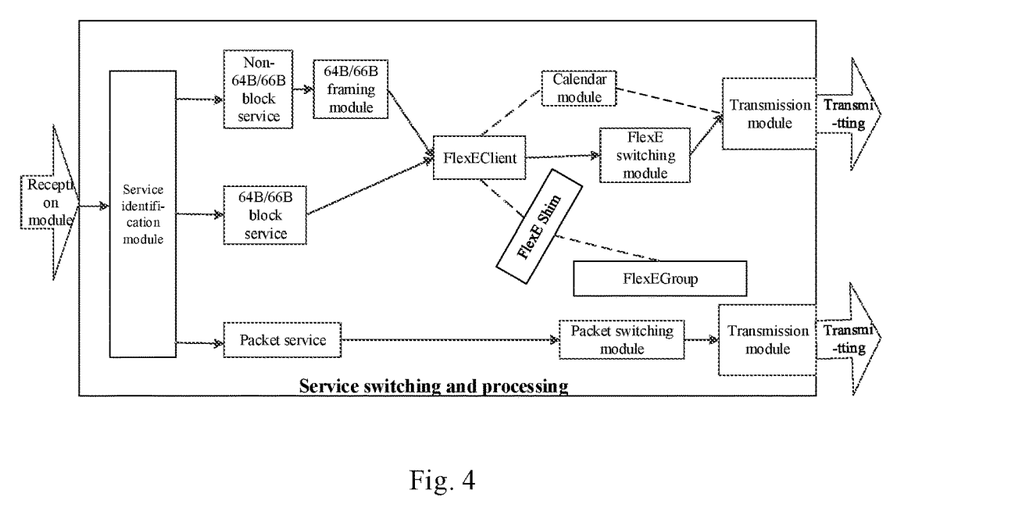
FIG. 4 is a modular block diagram of a data switching and transmission apparatus provided by some embodiments of the present disclosure.

As shown in FIG. 4, some embodiments of the present disclosure further provide a data switching and transmission apparatus. The apparatus includes: a reception module, configured to receive service data from an upper layer; a flexible Ethernet time slot control module, configured to map, according to a block sequence, the service data from the upper layer onto a flexible Ethernet group located at a physical layer; a flexible Ethernet switching module, configured to perform a switching in the physical layer and transmission of the service data according to the block sequence.

The flexible Ethernet time slot control module is further configured to recover, from the block sequence received by the flexible Ethernet group, corresponding service data.

The data switching and transmission apparatus further includes: a service identification module, configured to identify the service data from the upper layer, and map, according to the block sequence, identified non-packet-switched service data from the upper layer onto the flexible Ethernet group located at the physical layer.

The data switching and transmission apparatus further includes a flexible Ethernet client carried over the flexible Ethernet group, where the flexible Ethernet client is configured to: when it is identified by the service identification module that the non-packet-switched service includes service data in 66-bit blocks, map, according to a 66-bit block sequence, the service data in 66-bit blocks from the upper layer onto the flexible Ethernet group located at the physical layer; or when it is identified by the service identification module that the non-packet-switched service includes service data not in 66-bit blocks, disassemble the service data not in 66-bit blocks to obtain a payload of the service data, encapsulate the payload into 66-bit blocks, and map, according to a 66-bit block sequence, the 66-bit blocks onto the flexible Ethernet group located at the physical layer.

The flexible Ethernet switching module is specifically configured to: perform the switching in the physical layer and transmission of the service data on blocks in the block sequence according to an identifier of a flexible Ethernet group and an identifier of a flexible Ethernet client by which the blocks are input and an identifier of a flexible Ethernet group and an identifier of a flexible Ethernet client by which the blocks are output.

It is noted, the apparatus corresponds to the foregoing method, and all the implementations of the method embodiments are applicable to the embodiments of the apparatus and may achieve the same technical effect.

Some embodiments of the present disclosure further provide data switching and transmission equipment, which includes a transmission network system as shown in FIG. 2. The data switching and transmission equipment specifically includes: a flexible Ethernet group located at a physical layer; at least one flexible Ethernet client carried over the flexible Ethernet group; a flexible Ethernet time slot control module, configured to map, according to a block sequence, service data from an upper layer onto the flexible Ethernet group; and recover, from the block sequence received by the flexible Ethernet group, corresponding service data; a flexible Ethernet switching module, configured to perform a switching in the physical layer and transmission of the service data according to the block sequence.

The flexible Ethernet switching module is located in a forwarding plane module of the data switching and transmission equipment, and the forwarding plane module is provided with at least one flexible Ethernet interface.

It is noted, all features of the aforementioned system as shown in FIG. 2 are applicable to the embodiments of the equipment and may achieve the same technical effect.

Figure 5:
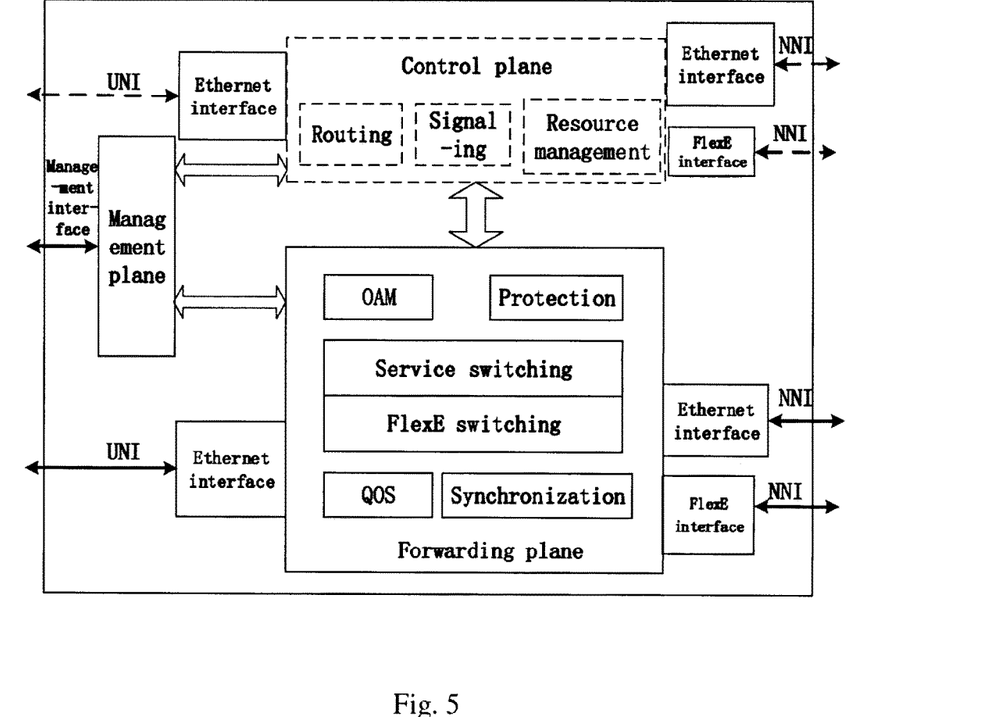
FIG. 5 is a modular block diagram of data switching and transmission equipment provided by some embodiments of the present disclosure.

As shown in FIG. 5, a function modular diagram of the foregoing equipment is illustrated. The function modules of the foregoing equipment are implemented in the flexible Ethernet switching part of the forwarding plane as shown in FIG. 5. The forwarding plane may further includes functions and corresponding modules related to OAM, protection, QOS, synchronization, etc.

The equipment may further include a control plane and a management plane, where the control plane is connected to an Ethernet interface and implements functions such as routing, signaling and resource management.

Some embodiments of the present disclosure further provide a transmission network system. The system includes: an Ethernet transmission subsystem and an optical network transmission subsystem, where the Ethernet transmission subsystem and the optical network transmission subsystem are connected via a unified cross switching matrix; the Ethernet transmission subsystem includes: a flexible Ethernet group located at a physical layer; at least one flexible Ethernet client carried over the flexible Ethernet group; a flexible Ethernet time slot control module, configured to map, according to a block sequence, service data from an upper layer onto the flexible Ethernet group; and recover, from the block sequence received by the flexible Ethernet group, corresponding service data; a flexible Ethernet switching module, configured to perform a switching in the physical layer and transmission of the service data according to the block sequence; the optical network transmission subsystem includes: at least one optical network unit (ODU); a flexible Ethernet group; at least one flexible Ethernet client carried over the flexible Ethernet group; a flexible Ethernet time slot control module, configured to map service data from an upper layer into the at least one optical network unit via the flexible Ethernet group; and recover, from data received by the at least one optical network unit, corresponding service data; an optical network switching module, configured to perform a switching and transmission of service data according to a block sequence whose size is a preset times of the block sequence divided by the optical network unit; where the optical network switching module and the flexible Ethernet switching module are separately connected to the unified cross switching matrix. The optical network switching module enables a switching in 66-bit blocks, and the flexible Ethernet switching module enables a switching in 66-bit blocks.

Figure 6:
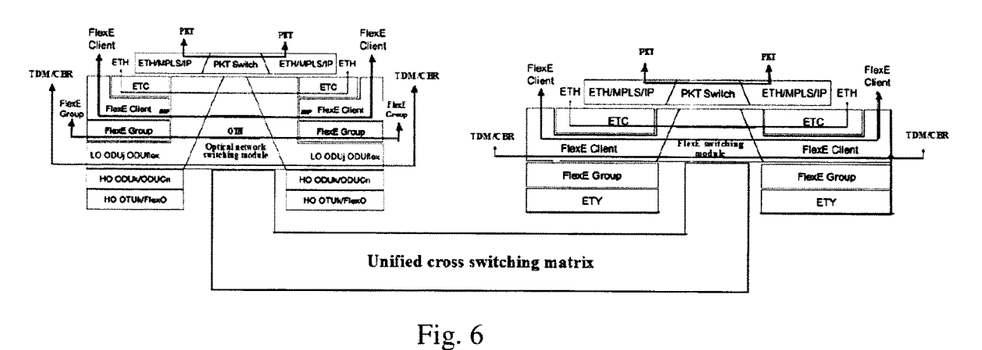
FIG. 6 is a schematic diagram of an architecture of a transmission network system provided by some embodiments of the present disclosure.

As shown in FIG. 6, the optical network switching module resides in the optical network transmission subsystem and the flexible Ethernet switching module resides in the Ethernet transmission subsystem. The unified cross switching matrix is a switching device, and the switching device is provided with a slot for connecting the optical network switching module and a slot for connecting the flexible Ethernet switching module. The optical network switching module is a programmable OTN card, and the flexible Ethernet switching module is a programmable flexible Ethernet network card.

In some embodiments of the present disclosure, based on the unified cross switching matrix, ODUK units and flexible Ethernet switching units may be encapsulated flexibly by means of an adaptive encapsulation.

Further, in some embodiments of the present disclosure, a slot system is built around the unified cross switching matrix. Some slots of the slot system are plugged with OTN client side card and OTN line side card and function as an OTN subsystem logically; while other slots of the slot system are configured for Ethernet/flexible Ethernet line side card or client side card and function as an Ethernet/flexible Ethernet subsystem.

It is further noted, the two subsystems may be connected to each other via the unified switching matrix to form the entire equipment.

Owing to the slot-based unified switching structure of the system, the OTN subsystem and Ethernet/flexible Ethernet subsystem may be configured flexibly according to the demand of existing network. This architecture based on the OTN and Ethernet may be applied to different scenarios of a single integrated future 5G mobile-oriented transmission network in a more flexible manner. In case that a card in this system is programmable, the card may be programed as OTN card or Ethernet/flexible Ethernet card, thereby offering more flexibility.

In the OTN subsystem, ODUk may be converted by the OTN optical network switching module to a structure which is recognizable by the unified cross matrix. In the Ethernet subsystem, the flexible Ethernet switching module (64/66-bit block cross connect unit) converts the 66-bit blocks to a structure which is recognizable by the unified cross switching matrix.

According to some embodiments of the present disclosure, a L1 layer switching may be performed directly on 66-bit blocks, thereby reducing latency resulting from a message recovery process, and jitter resulting from a L2 layer switching. Meanwhile, by means of an adaptive mapping, two types of interfaces, namely ODUk and flexible Ethernet group, flexible Ethernet client, may be supported by the same platform, and by means of the unified cross matrix, a hybrid cross in any proportion between ODUk and flexible Ethernet client may be achieved.

The above descriptions merely describe some implementations of the present disclosure. It is noted, modifications and improvements may be made by a person of ordinary skill in the art without departing from the principle of the present disclosure, and these modifications and improvements shall fall within the scope of the present disclosure.

What is claimed is:

1. A transmission network system, comprising:
an Ethernet transmission subsystem and an optical network transmission subsystem, wherein the Ethernet transmission subsystem and the optical network transmission subsystem are connected via a unified cross switching matrix;
the Ethernet transmission subsystem comprises:
a flexible Ethernet group (FlexE Group) located at a physical layer;
at least one flexible Ethernet client (FlexE Client) carried over the flexible Ethernet group (FlexE Group);
a flexible Ethernet time slot controller, configured to map, according to a block sequence, service data from an upper layer onto the flexible Ethernet group (FlexE Group); and recover, from the block sequence received by the flexible Ethernet group (FlexE Group), corresponding service data;
a flexible Ethernet switch, configured to perform switching in a physical layer and transmission of the service data according to the block sequence;
the optical network transmission subsystem comprises:
at least one optical network unit;
a flexible Ethernet group (FlexE Group);
at least one flexible Ethernet client (FlexE Client) carried over the flexible Ethernet group (FlexE Group);
a flexible Ethernet time slot controller (FlexE Shim), configured to map service data from an upper layer into the at least one optical network unit via the flexible Ethernet group (FlexE Group); and recover, from data received by the at least one optical network unit, corresponding service data;
an optical network switch, configured to perform a switching and transmission of service data according to a block sequence whose size is a preset times of the block sequence divided by the optical network unit;
wherein the optical network switch and the flexible Ethernet switch are separately connected to the unified cross switching matrix.

2. The transmission network system according to claim 1, wherein the unified cross switching matrix is a switching device, and the switching device is provided with a slot for connecting the optical network switch and a slot for connecting the flexible Ethernet switch.

3. The transmission network system according to claim 1, wherein the optical network switch is a programmable optical transmission network (OTN) card, and the flexible Ethernet switch is a programmable flexible Ethernet network card.

4. The transmission network system according to claim 1, wherein the block sequence comprises a series of blocks of a preset size.

5. The transmission network system according to claim 4, wherein the blocks of the preset size are 66-bit, 64b/66b, blocks.

6. The transmission network system according to claim 1, wherein the service data from the upper layer comprises non-packet-switched service data.

7. The transmission network system according to claim 1, wherein the flexible Ethernet group (FlexE Group) comprises at least one Ethernet physical sublayer optical interface, PHY.

8. The transmission network system according to claim 7, wherein a calendar circuit for the flexible Ethernet group (FlexE Group) divides the flexible Ethernet group (FlexE Group) into a plurality of time slots and bonds the flexible Ethernet client (FlexE Client) to at least one time slot of the plurality of time slots to perform the transmission of the service data.

9. The transmission network system according to claim 8, wherein data alignment of the PHYs of the flexible Ethernet group (FlexE Group) is achieved by inserting a flexible Ethernet overhead in the block sequence carried by the flexible Ethernet group (FlexE Group).

10. The transmission network system according to claim 9, wherein the flexible Ethernet overhead comprises: a flexible Ethernet calendar circuit configuration, a flexible Ethernet group identifier, a flexible Ethernet client identifier and/or management channel data.

11. The transmission network system according to claim 9, wherein each PHY of the flexible Ethernet group has a preset quantity of overhead blocks carrying the flexible Ethernet overhead.

12. The transmission network system according to claim 11, wherein the overhead blocks and service data blocks are of a spaced distribution according to a preset period.

* * * * *